(12) United States Patent
Evens et al.

(10) Patent No.: US 10,000,019 B2
(45) Date of Patent: Jun. 19, 2018

(54) INSTALLATION ASSEMBLY AND ASSOCIATED METHOD FOR FORMING A BONDED JOINT

(71) Applicant: The Boeing Company, Chicago, IL (US)

(72) Inventors: Michael W. Evens, Auburn, WA (US); Megan Nicole Watson, Kent, WA (US); Russell L. Keller, Maple Valley, WA (US); Nicholas H. Room, Seattle, WA (US); John F. Spalding, Renton, WA (US); Mary Helen Vargas, Woodinville, WA (US); James D. Chanes, Auburn, WA (US); Kathy Lynn Ferguson, Woodinville, WA (US); Joseph Lawrence Hafenrichter, Seattle, WA (US)

(73) Assignee: The Boeing Company, Chicago, IL (US)

( * ) Notice: Subject to any disclaimer, the term of this patent is extended or adjusted under 35 U.S.C. 154(b) by 219 days.

(21) Appl. No.: 15/094,422

(22) Filed: Apr. 8, 2016

(65) Prior Publication Data

US 2016/0221257 A1 Aug. 4, 2016

Related U.S. Application Data

(62) Division of application No. 13/847,625, filed on Mar. 20, 2013, now Pat. No. 9,308,688.

(51) Int. Cl.
  *B29C 65/00* (2006.01)
  *B32B 37/00* (2006.01)
  (Continued)

(52) U.S. Cl.
  CPC .............. *B29C 66/90* (2013.01); *B29C 65/00* (2013.01); *B29C 73/12* (2013.01); *B32B 37/00* (2013.01);
  (Continued)

(58) Field of Classification Search
  CPC ......... B29C 65/00; B29C 65/02; B29C 65/48; B29C 65/485; B29C 65/4835;
  (Continued)

(56) References Cited

U.S. PATENT DOCUMENTS 5,582,677 A * 12/1996 Miwa .................. B29C 66/1122
  156/381
8,205,653 B2 6/2012 Kim et al.
(Continued)

FOREIGN PATENT DOCUMENTS

WO WO-2012/050712 4/2012

OTHER PUBLICATIONS

Office Action for U.S. Appl. No. 13/47,625 dated May 21, 2015.

*Primary Examiner* — Michael N Orlando
*Assistant Examiner* — Matthew Hoover
(74) *Attorney, Agent, or Firm* — Alston & Bird LLP

(57) ABSTRACT

An installation assembly and an associated method for forming a bonded join are provided to permit the adhesive attachment of a first workpiece, such as a patch, to a portion of a second workpiece. The installation assembly and the associated method provide for at least partial debulking of the adhesive prior to curing of the adhesive such that the resulting bondline may have improved mechanical properties as a result of having fewer voids and/or porosity. The installation assembly may include an installation stand and a carrier plate supported by the installation stand and including an attachment surface configured to carry the first workpiece. The installation stand also includes an adjust- (Continued)

ment mechanism for positioning a carrier plate to a first predefined position to define a gap between the first and second workpieces and also to a second predefined position such that a predetermined bondline thickness is defined between the first and second workpieces.

11 Claims, 6 Drawing Sheets

(51) Int. Cl.
*B29C 73/12* (2006.01)
*B29C 65/48* (2006.01)
*B29C 65/56* (2006.01)
*B29C 65/78* (2006.01)
*B32B 37/10* (2006.01)
*B29C 65/02* (2006.01)
*B29C 73/10* (2006.01)
*B32B 37/12* (2006.01)
*B32B 38/18* (2006.01)
*B29L 31/24* (2006.01)

(52) U.S. Cl.
CPC .............. *B29C 65/02* (2013.01); *B29C 65/48* (2013.01); *B29C 65/483* (2013.01); *B29C 65/4835* (2013.01); *B29C 65/4845* (2013.01); *B29C 65/56* (2013.01); *B29C 65/562* (2013.01); *B29C 65/78* (2013.01); *B29C 65/782* (2013.01); *B29C 66/00* (2013.01); *B29C 66/0012* (2013.01); *B29C 66/00145* (2013.01); *B29C 66/40* (2013.01); *B29C 66/41* (2013.01); *B29C 66/47* (2013.01); *B29C 66/472* (2013.01); *B29C 66/80* (2013.01); *B29C 66/81* (2013.01); *B29C 66/812* (2013.01); *B29C 73/10* (2013.01); *B29L 2031/24* (2013.01); *B32B 37/0007* (2013.01); *B32B 37/10* (2013.01); *B32B 37/1284* (2013.01); *B32B 38/1833* (2013.01)

(58) Field of Classification Search
CPC ... B29C 65/4845; B29C 65/56; B29C 65/562; B29C 65/78; B29C 65/782; B29C 66/00; B29C 66/0012; B29C 66/00145; B29C 66/40; B29C 66/41; B29C 66/47; B29C 66/472; B29C 66/80; B29C 66/81; B29C 66/812; B29C 66/814; B29C 66/8141; B29C 66/8145; B29C 66/83; B32B 37/00; B32B 37/10; B32B 37/04; B32B 37/06; B32B 37/1018; B32B 37/12; B32B 2037/1215; B32B 2037/053
See application file for complete search history.

(56) References Cited

U.S. PATENT DOCUMENTS

| 2011/0139344 | A1* | 6/2011 | Watson ................... B29C 73/12 156/94 |
| 2011/0174426 | A1 | 7/2011 | Weimer et al. |
| 2012/0080135 | A1 | 4/2012 | Evens et al. |
| 2013/0034713 | A1 | 2/2013 | Busman et al. |

* cited by examiner

INSTALLATION ASSEMBLY AND ASSOCIATED METHOD FOR FORMING A BONDED JOINT

CROSS-REFERENCE TO RELATED APPLICATION

This application is a divisional of and claims priority to U.S. application Ser. No. 13/847,625, filed on Mar. 20, 2013, which will issue on Apr. 12, 2016 as U.S. Pat. No. 9,308,688, the entire contents of which is hereby incorporated by reference.

TECHNOLOGICAL FIELD

An example embodiment of the present disclosure relates generally to techniques for forming a bonded joint and, more particularly, to an installation assembly and associated method for forming a bonded joint between first and second workpieces.

BACKGROUND

A variety of workpieces may have or develop inconsistencies that may be addressed by the adherence of a patch, such as a doubler, to the portion of the workpiece that contains the inconsistency. For example, the vehicular structures, such as airframes, ship hulls or the like, may develop inconsistencies that may be remedied by the application of a patch to the portion of the structure exhibiting the inconsistency. Similarly, building structures, such as bridge girders, support columns or the like, may develop inconsistencies to which a patch may be applied.

In order to remedy an inconsistency within a workpiece, a patch may be adhered to the portion of the workpiece that exhibits the inconsistency. The patch may be formed of a metal or composite material depending upon the underlying workpiece. In order to adhere a patch to the portion of the workpiece that exhibits an inconsistency, a paste adhesive may be utilized to form the bonded joint between the patch and the underlying workpiece. A paste adhesive is generally a multi-component resin that is mixed uniformly into a paste for application and, as such, is distinct from a film adhesive. However, the use of paste adhesives in a bondline may introduce voids and/or porosity within the bondline once the patch and the workpiece have been cured and bonded together. Voids and/or porosity may reduce the mechanical properties that are otherwise anticipated to be exhibited by the adhesive. The formation of voids and/or porosity and the resulting reduction in the mechanical properties of the adhesive is particularly problematic with paste adhesives that have high viscosities since paste adhesives having higher viscosities tend to not flow sufficiently, thereby retaining entrapped air in the bondline to a greater degree than paste adhesives that have lower viscosities.

In an effort to reduce the voids and/or porosity, high pressure autoclaves have been utilized. However, high pressure autoclaves may not be feasible to be utilized in many cases depending upon, for example, the size and shape of the workpiece, the location of the workpiece, e.g., in the field, etc.

A workpiece having a patch adhered to it with a bond line that includes voids and/or porosity may be used in its existing condition taking into account the reduction in the mechanical properties of the adhesive. Alternatively, the patch may be reprocessed in an effort to improve the mechanical properties. For example, the patch that was previously adhered to the workpiece may be removed and a different patch may be adhered to the workpiece in an effort to bond the patch to the workpiece with an adhesive and process that creates fewer voids and/or porosity. While such reprocessing may sometimes improve the mechanical properties of the adhesive, such reprocessing is inefficient and may delay the eventual return of the workpiece to service.

BRIEF SUMMARY

An installation assembly and an associated method for forming a bonded joint are provided in accordance with an example embodiment of the present disclosure. The installation assembly and the associated method provide for the adhesive attachment of a first workpiece, such as a patch, to a portion of a second workpiece. The installation assembly and the associated method provide for at least partial debulking of the adhesive prior to curing of the adhesive. As such, the resulting bondline may have improved mechanical properties as a result of having fewer voids and/or porosity. Thus, the installation assembly and the associated method of one embodiment may permit a workpiece to be reworked in a manner that permits the workpiece to be returned to service in an efficient manner, while improving the mechanical properties associated with the resulting bond joint.

In one embodiment, a method is provided that includes releasably attaching a first workpiece, such as a patch, to a carrier plate. The method also applies adhesive to at least one of the first workpiece or a portion of a second workpiece to be reworked. The method also controllably positions the carrier plate and the patch releasably attached thereto in an aligned relationship to the portion of the second workpiece to be reworked while maintaining a gap between the first and second workpieces. The method also applies a vacuum to at least the gap between the first and second workpieces to at least partially debulk the adhesive. The method then repositions the carrier plate relative to the second workpiece to close the gap and applies the vacuum to the carrier plate and the portion of second workpiece after having closed the gap while the adhesive at least partially cures. In one embodiment, the method may also heat the carrier plate while applying a vacuum to the carrier plate and the portion of second workpiece after having closed the gap.

A method of one embodiment may reposition the carrier plate relative to the second workpiece to define a predetermined bondline thickness between the first and second workpieces. In one embodiment, the method may also include adjusting a plurality of standoffs carried by the carrier plate to define a predetermined bondline thickness with the carrier plate then being repositioned relative to the second workpiece until the plurality of standoffs contact the second workpiece. In one embodiment, the method may also include placing a gasket upon the carrier plate, opposite the first workpiece, such that the gasket extends beyond the carrier plate. In this embodiment, the gasket is placed upon the carrier plate prior to applying the vacuum.

The carrier plate may be supported by an installation stand. In this embodiment, the method may also include placing the installation stand upon a second workpiece prior to controllably positioning the carrier plate. In this embodiment, a carrier plate may be controllably positioned and repositioned by controllably adjusting a position of the carrier plate relative to the installation stand. The method of this embodiment may also include detaching the carrier plate from the installation stand and removing the installation stand from the second workpiece while applying a vacuum to the carrier plate and the portion of the second workpiece after having closed the gap. The installation stand of this embodiment may include a plurality of feet configured to support the installation stand upon the second workpiece. As such, the method of this embodiment may also include releasably securing the installation stand to the second workpiece by applying a vacuum between the feet of the installation stand and the second workpiece.

In another embodiment, an installation assembly is provided that includes an installation stand and a carrier plate supported by the installation stand. The carrier plate includes an attachment surface configured to carry a first workpiece, such as a patch, in a facing relationship to a second workpiece and a plurality of standoffs configured to extend outwardly from the attachment surface to define a predetermined bondline thickness between the first and second workpieces. The plurality of standoffs may, for example, be adjustable relative to the attachment surface of the carrier plate to define different predetermined bondline thicknesses. The installation stand of this embodiment also includes an adjustment mechanism for controllably positioning the carrier plate relative thereto and relative to the second workpiece.

The installation stand may include a plurality of feet configured to support the installation stand upon the second workpiece. In this embodiment, the installation assembly may also include a vacuum system configured to apply a vacuum between the feet and the second workpiece. The carrier plate may be configured to be detached from the installation stand. The carrier plate of one embodiment is formed of a thermally conductive material and is configured to be heated.

In a further embodiment, an installation assembly is provided that includes an installation stand and a carrier plate supported by the installation stand. The carrier plate includes an attachment surface configured to carry a first workpiece, such as a patch, in a facing relationship to a second workpiece. The installation stand of this embodiment also includes an adjustment mechanism for controllably positioning a carrier plate to a first predefined position relative to the second workpiece so as to define a gap between the first and second workpieces and also to a second predefined position relative to the second workpiece such that a predetermined bondline thickness is defined between the first and second workpieces. The installation assembly of this embodiment also includes a vacuum system configured to apply a vacuum both while the carrier plate is in the first predefined position and then the second predefined position.

The carrier plate of one embodiment includes a plurality of standoffs configured to extend downwardly from the attachment surface to define the predetermined bondline thickness between the first and second workpieces in the second predefined position. The plurality of standoffs may be adjustable relative to the attachment surface of the carrier plate to define different predetermined bondline thicknesses. The carrier plate may be configured to be detached from the installation stand. The installation stand of one embodiment may include a plurality of feet configured to support the installation stand upon the second workpiece. In this embodiment, the installation assembly may also include an attachment vacuum system configured to apply a vacuum between the feet and the second workpiece.

BRIEF DESCRIPTION OF THE DRAWINGS

Figure 1:
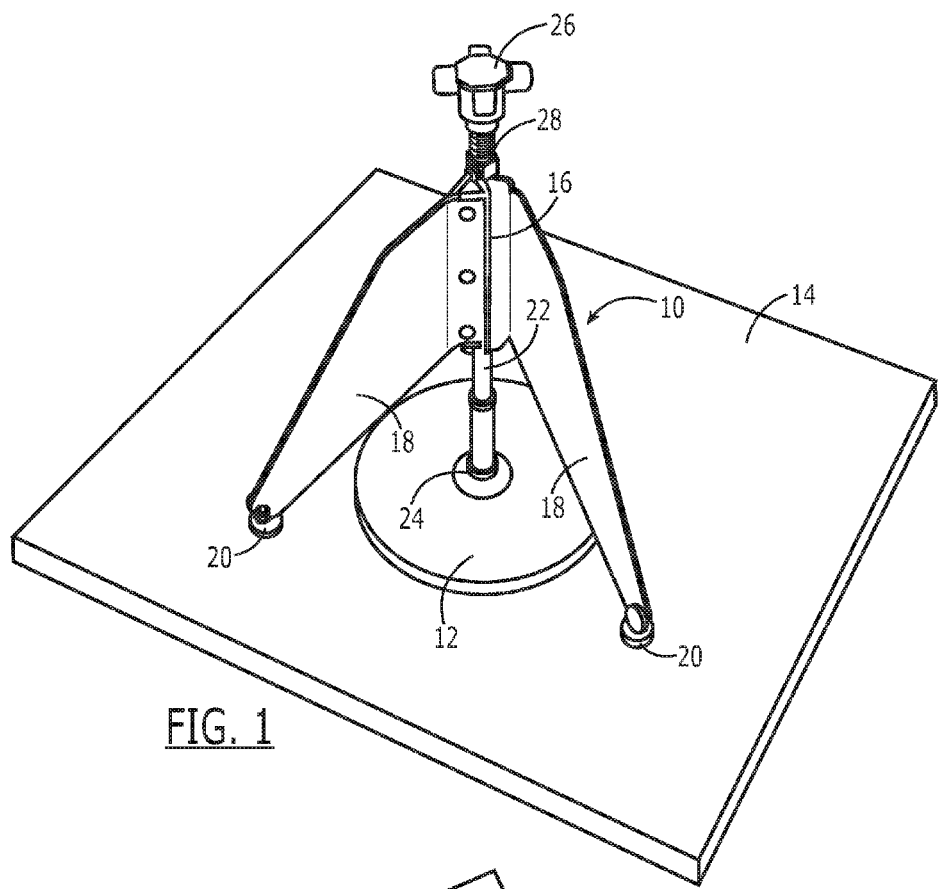
Figure 2:
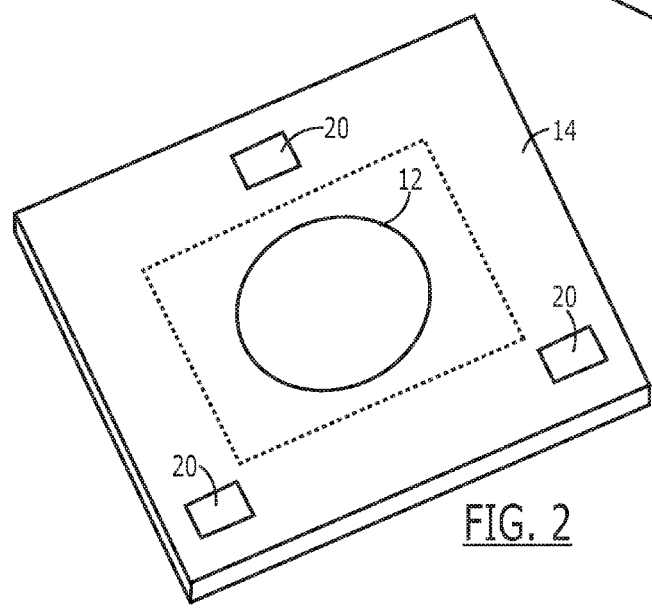
Figure 3:
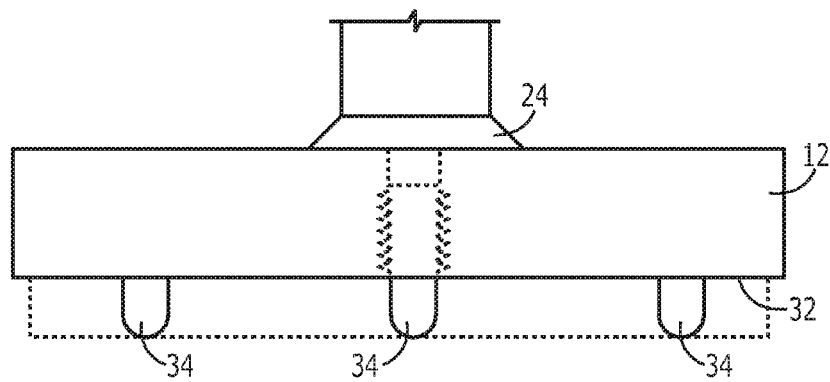
Figure 4:
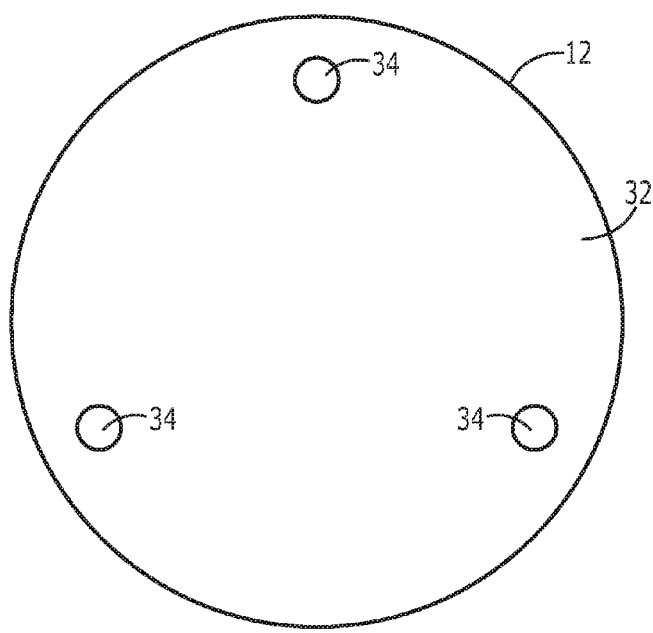
Figure 5:
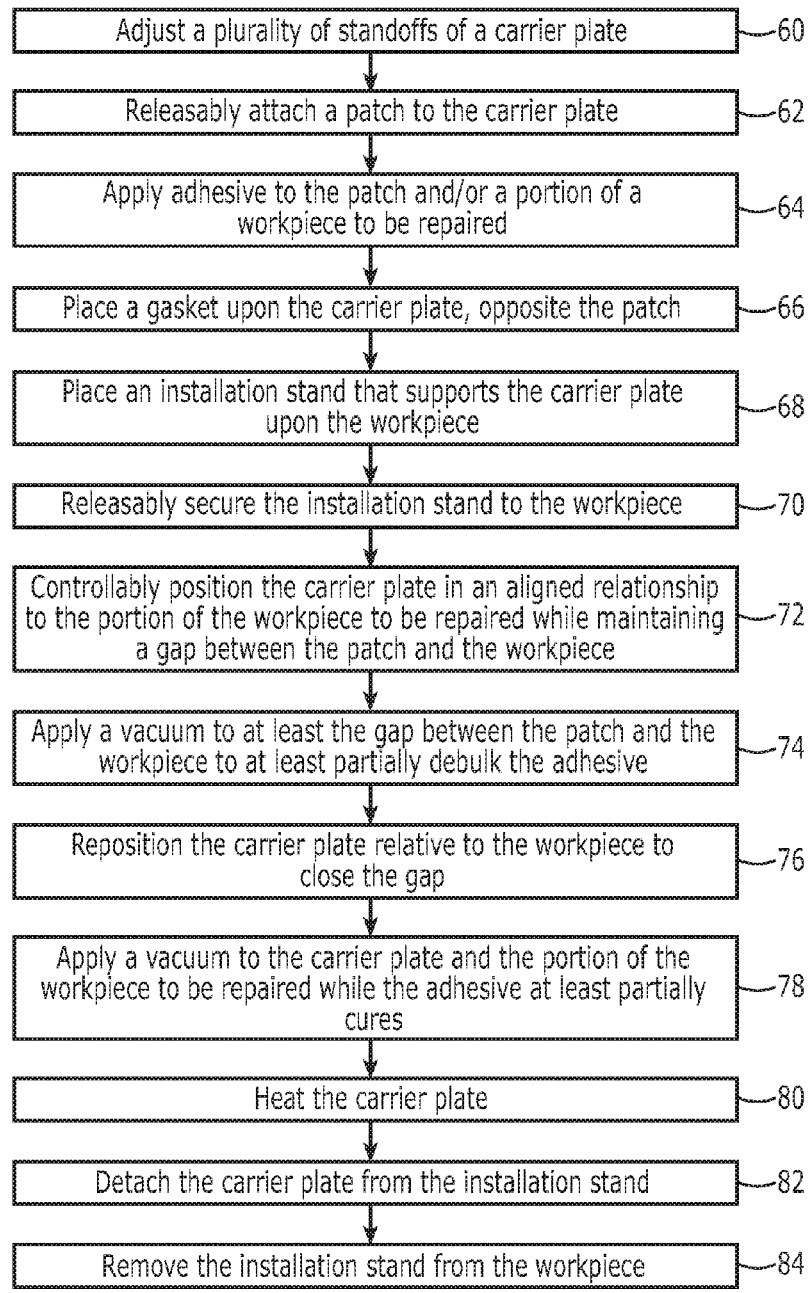
Figure 6:
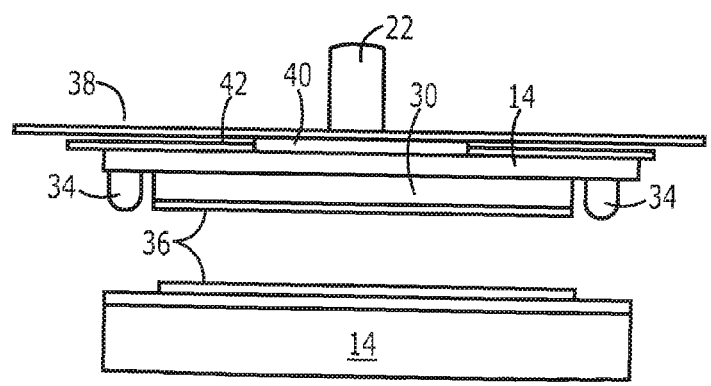
Figure 7:
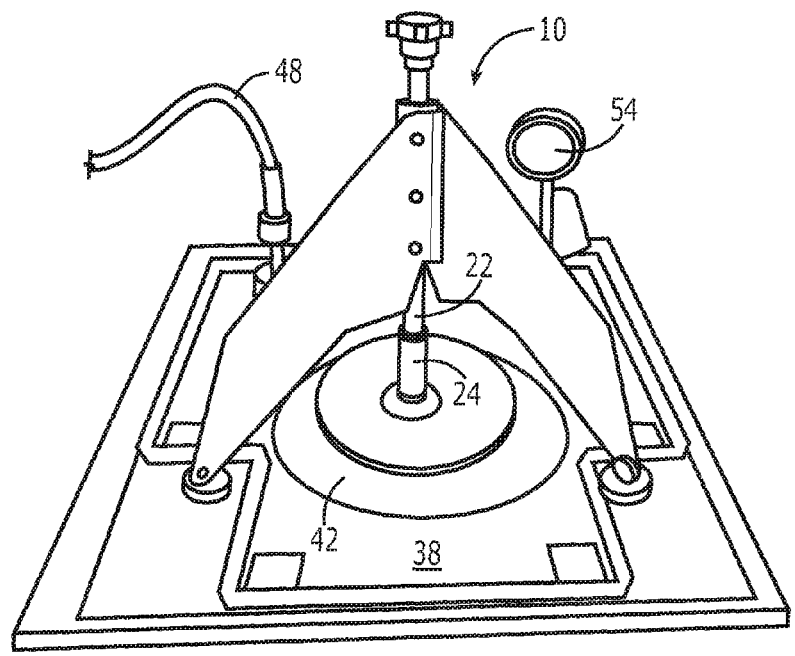
Figure 8:
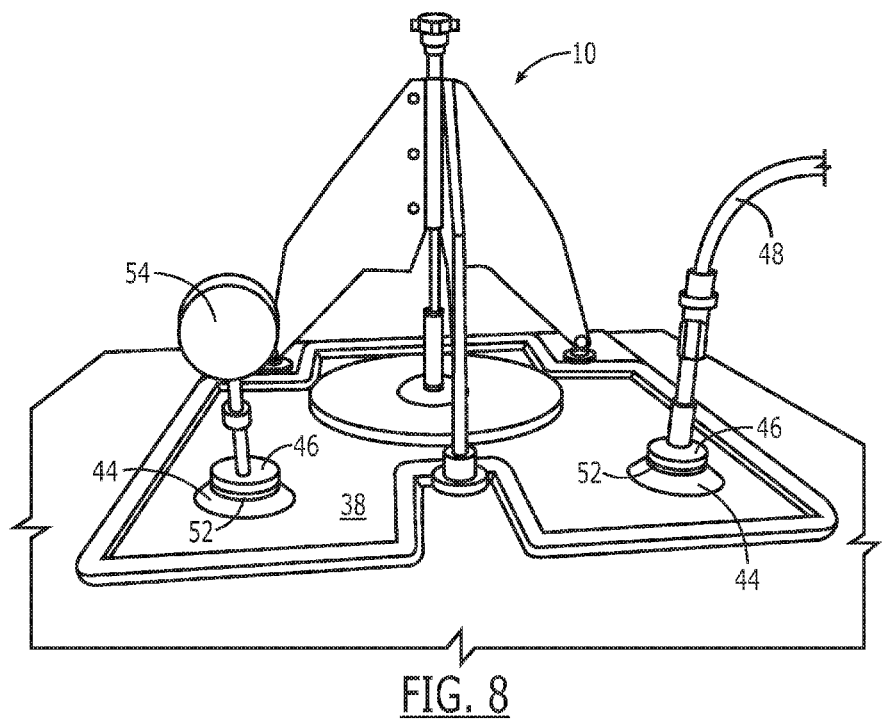
Figure 9:
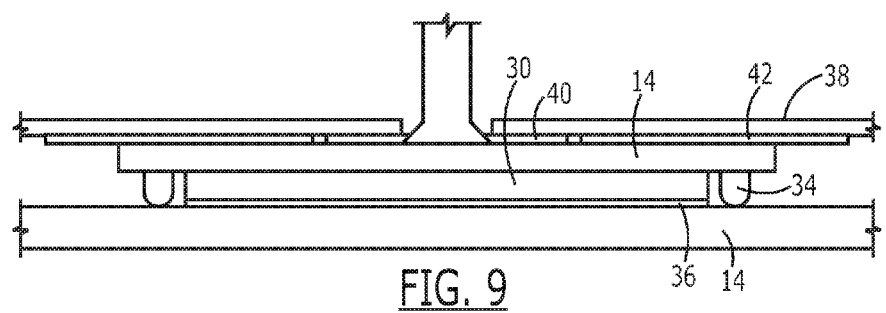
Figure 10:
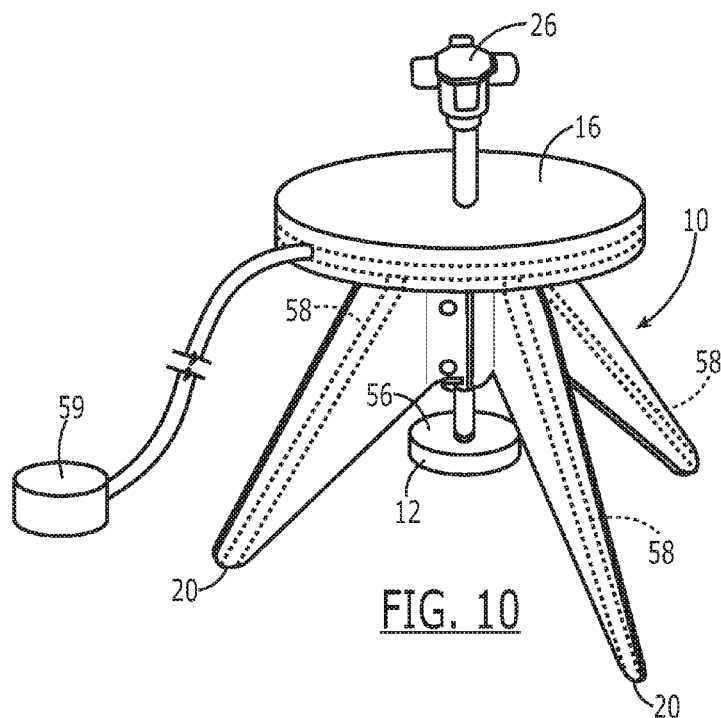
Figure 11:
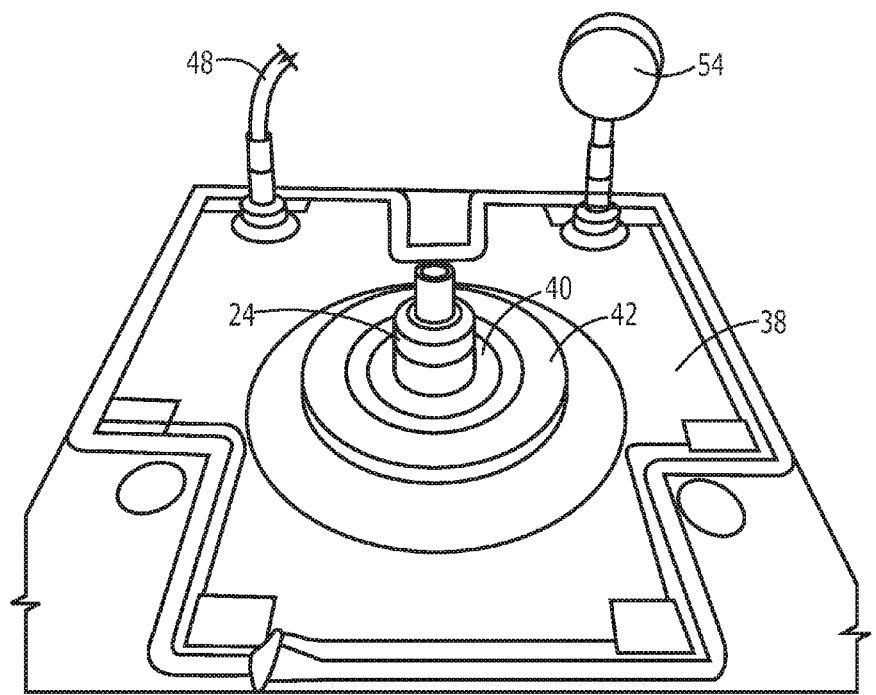

Having thus described certain example embodiments of the present disclosure in general terms, reference will hereinafter be made to the accompanying drawings, which are not necessarily drawn to scale, and wherein:

FIG. 1 is a perspective view of an attachment assembly in accordance with one embodiment of the present disclosure;

FIG. 2 is a perspective view of a portion of a workpiece to be reworked with markings indicating the relative position of the installation assembly in accordance with an example embodiment of the present disclosure;

FIG. 3 is a side view of a carrier plate including a plurality of standoffs in accordance with an example embodiment of the present disclosure;

FIG. 4 is a plan view of the attachment surface of the carrier plate of FIG. 3 illustrating the plurality of standoffs extending outwardly therefrom in accordance with an example embodiment of the present disclosure;

FIG. 5 is a flowchart illustrating the operations performed to form a bonded joint in accordance with an example embodiment of the present disclosure;

FIG. 6 is a side view of a portion of the installation assembly including the carrier plate, the gasket and a portion of a vacuum bag illustrating a first predefined position in which a first workpiece, such as a patch, is positioned relative to a second workpiece workpiece in a manner that maintains a gap therebetween in accordance with an example embodiment of the present disclosure;

FIG. 7 is a perspective view of an installation assembly positioned upon a workpiece in an aligned relationship with a portion of the workpiece to be reworked in accordance with an example embodiment of the present disclosure;

FIG. 8 is a perspective view of the installation assembly of FIG. 7 taken from the opposite side in accordance with an example embodiment of the present disclosure;

FIG. 9 is a side view of a portion of an attachment assembly including the carrier plate, the gasket and a portion of a vacuum bag illustrating a second predefined position in which the standoffs of the carrier plate are in contact with the workpiece and a bondline having a predetermined thickness is defined in accordance with an example embodiment of the present disclosure;

FIG. 10 is a perspective view of an installation assembly in accordance with another example embodiment of the present disclosure; and FIG. 11 is a perspective view of a portion of an installation assembly mounted upon a workpiece following removal of the installation stand in accordance with an example embodiment of the present disclosure.

DETAILED DESCRIPTION

The present disclosure now will be described more fully with reference to the accompanying drawings, in which some, but not all embodiments of the invention are shown. This disclosure may be embodied in many different forms and should not be construed as limited to the embodiments set forth; rather, these embodiments are provided so that this disclosure will be thorough and complete, and will fully convey the scope of the invention to those skilled in the art. Like numbers refer to like elements throughout.

A portion of an installation assembly, including an installation stand 10 and a carrier plate 12 supported by the installation stand, for forming a bonded joint is illustrated in FIG. 1. Bonded joints may be formed between first and second workpieces for a variety of purposes. By way of example, but not of limitation, the formation of a bonded joint will be hereinafter described in conjunction with the formation of a bonded joint having a predetermined bondline thickness between a first workpiece in the form of a patch and a portion of a second workpiece to be reworked. In this regard, the installation assembly and associated method of an example embodiment of the present disclosure may be configured to rework a variety of different inconsistencies exhibited by a workpiece by applying a patch to the portion of the workpiece in need of rework such that the resulting patched workpiece has improved mechanical properties. The installation assembly and the associated method of an example embodiment of the present disclosure may rework a variety of workpieces intended for a myriad of different applications and formed of a number of different materials. For example, the workpiece may be a structural component of a vehicle, such as an airframe, a ship hull or the like, or a building structure, such as a bridge girder, support column or the like. The workpiece may be formed of a metallic material, a composite material or combinations thereof.

The installation stand 10 may include a base 16 and a plurality of legs 18 with each leg having a respective foot 20 for making contact with the workpiece 14 and supporting the installation stand thereupon. The installation stand may also include an adjustment mechanism 22. Although the adjustment mechanism may be configured in various manners, the adjustment mechanism of one embodiment is embodied by an elongate member that includes a threaded portion that extends through and is threadably engaged with a threaded aperture defined by the body of the installation stand. For example, the body of the installation stand may define the threaded aperture to be aligned along a centerline of the installation stand intermediate the plurality of legs.

As noted above, the installation assembly also includes a carrier plate 12 that is supported by the installation stand 10. In one embodiment, the carrier plate is connected to the adjustment mechanism 22, such as by being connected to one end of an elongate member that may serve as the adjustment mechanism. The carrier plate may be connected in various manners to one end of the elongate member. For example, the carrier plate may include a coupling portion 24. The coupling portion may include a threaded coupling that may be threadably engaged to a threaded end of the elongate member. Alternatively, the coupling portion of the carrier plate may be configured to permit the carrier plate to be connected by a pin to the end of the elongate rod. Regardless of the manner in which the coupling portion is attached to the elongate member, the coupling portion may be configured to permit pivoting of the carrier plate to accommodate variations in the workpiece. For example, the coupling portion may include a ball socket.

As shown in FIG. 1, the carrier plate 12 may, in one embodiment, be positioned along the centerline defined by the installation stand 10 so as to be positioned between the plurality of legs 18 of the installation stand. The adjustment mechanism 22 is configured to permit repositioning of the carrier plate relative to the remainder of the installation stand and relative to the workpiece 14 upon which the installation stand is positioned. In the embodiment in which the adjustment mechanism is embodied as an elongate member, the elongate member may be threadably advanced or retracted relative to the body 16 of the alignment stand in order to reposition the carrier plate closer to the workpiece or to lift the carrier plate away from the workpiece, respectively. In order to facilitate the threaded advancement or retraction of the elongate member relative to the remainder of the installation stand, the elongate member may include a handle 26 mounted upon one end of the elongate member, opposite the carrier plate as shown in FIG. 1. In one embodiment, the adjustment mechanism may also include a lock nut or other locking mechanism 28 for locking the adjustment mechanism in position relative to the remainder of the installation stand once the carrier plate has been appropriately positioned relative to the workpiece.

The installation stand 10 may be initially positioned upon the workpiece 14 such that the carrier plate 12 is aligned with the portion of the workpiece to be reworked, such as the portion of the workpiece exhibiting an inconsistency. In order to facilitate subsequent positioning of the installation stand upon the workpiece and the securing of a vacuum bag to the workpiece, markings may be made upon the workpiece to indicate the location of each of the feet 20 of the installation stand, as well as the location of the carrier plate. A perimeter for the vacuum bag may also be defined as shown by the dashed lines in FIG. 2. Although the perimeter of the vacuum bag illustrated in FIG. 2 is rectangular, the vacuum bag may have other shapes and sizes. However, the perimeter of the vacuum bag is generally defined in such a manner as not to include or encompass a foot of the installation stand therewithin.

The carrier plate 12 is configured to carry a patch 30 that will be adhered to a portion of the workpiece 14 to be reworked. As described below, a patch may be temporarily affixed to an attachment surface 32 of the carrier plate such that the patch is disposed in a facing relationship to the workpiece. In this regard, the attachment surface of the carrier plate is the surface of the carrier plate that faces the workpiece. As described below, the patch will be affixed to the workpiece by an adhesive that has a predetermined bondline thickness between the patch and the workpiece in order to provide the desired mechanical properties. As such, during the process of adhering the patch to the workpiece, the attachment surface of the carrier plate may be spaced from the surface of the workpiece by a gap having a width equal to the sum of the thickness of the patch and the predetermined bondline thickness.

In order to provide the gap of the desired width between the attachment surface 32 of the carrier plate 12 and the workpiece 14, the carrier plate of one embodiment may include a plurality of standoffs 34 extending outwardly from the attachment surface of the carrier plate, as shown in FIGS. 3 and 4. Although the carrier plate of the illustrated embodiment includes three standoffs positioned equally about the periphery of the carrier plate, the carrier plate may include a different number of standoffs and/or standoffs positioned in different manners in other embodiments. Although the standoffs may be formed of various materials, the standoffs of one embodiment are coated with a Teflon® material in order to limit or prevent damage to the workpiece from contact with the standoffs. The standoffs may be adjustable relative to the carrier plate so as to permit the standoffs to controllably extend different distances beyond the attachment surface of the carrier plate so as to define gaps of different distances between the attachment surface of the carrier plate and the workpiece, thereby accommodating patches 30 of different thicknesses and/or different predetermined bondline thicknesses. Although the standoffs may be adjustable relative to the carrier plate in different manners, the standoffs of one embodiment are threadably attached to the carrier plate as shown with respect to one of the standoffs in FIG. 3. Utilizing an Allen wrench, a screwdriver or other tool, the standoffs of this embodiment may be threadably extended or retracted relative to the carrier plate in order to define the desired distance between the attachment surface of the carrier plate and the workpiece.

Referring now to FIG. 5, the operations performed in order to rework a workpiece 14 in accordance for the example embodiment to the present disclosure are illustrated. Prior to commencing the rework process, the portion of the workpiece undergoing rework may optionally be prepared by sanding, wiping with a solvent and/or applying a conversion coating. As shown in block 60 of FIG. 5, the plurality of standoffs 34 of the carrier plate 12 may be adjusted so as to define the distance between the attachment surface 32 of the carrier plate and the workpiece. In one embodiment, the thickness of the patch and the predetermined bondline thickness may be predefined such that the plurality of the standoffs may be adjusted relative to the carrier plate so as to extend beyond the attachment surface of the carrier plate by the predefined distance. In another embodiment, the plurality of standoffs may be adjusted by temporarily affixing a spacer to the attachment surface of the carrier plate. For example, the spacer may be temporarily affixed to the attachment surface of the carrier plate with the same attachment mechanism, such as by two-sided tacky tape, as will be utilized to attach the patch 30 to the carrier plate during a rework operation. The spacer may be formed of a patch or a placeholder for the patch along with tape or other padding that is added to a surface of the patch or the placeholder of the patch, such as by adding tape or other padding to the surface of the patch or the placeholder for the patch that faces the workpiece. Following the addition of the tape or other padding, the thickness of the resulting spacer may be equal to the combination of the predetermined bondline thickness and the patch to be utilized during a rework operation.

With the standoffs 34 retracted, either fully or at least to such a degree that the spacer extends therebeyond, the carrier plate 12 may then be positioned upon the workpiece 14 in such a manner that the spacer contacts the surface of the workpiece. As shown in FIG. 3 with the spacer depicted in dashed lines, the standoffs 34 may then be adjustably advanced relative to the carrier plate in order to contact the surface of the workpiece, but not so far as to lift the spacer from the surface of the workpiece. Once the standoffs and the spacer all contact the surface of the workpiece, the standoffs will be considered to be properly positioned. The carrier plate may then be removed from the workpiece and the spacer may be removed therefrom.

The patch 30 may then be releasably attached to the attachment surface 32 of the carrier plate 12. See block 62 of FIG. 5. The patch may be releasably attached in various manners, but is attached by two-sided tacky tape in one embodiment. As such, the patch is secured to the attachment surface of the carrier plate, but may be released therefrom upon the application of a sufficient separation force therebetween. The patch may be formed of various materials including, for example, a metallic material, a composite material or the like. Typically, the patch is formed of the same material as the workpiece 14, although the patch may be formed of a different material than the workpiece in some embodiments. Although the carrier plate and the patch are both circular in the illustrated embodiment, the carrier plate and/or the patch may have a different shape in other embodiments, such as a rectangular shape or another more complex shape.

Adhesive 36 may then be applied to at least one of the patch 30 or the portion of the workpiece 14 to be reworked and, in one embodiment, adhesive is applied to both the patch and the portion of the workpiece to be reworked. See block 64 of FIG. 5. In an embodiment in which the adhesive is applied to the patch, the adhesive is applied to the surface of the patch that faces the workpiece. Various adhesives may be utilized including, for example, a paste adhesive, such as EA9394 adhesive. The adhesive is applied in a thickness that is at least as great and, in some instances, greater than the predetermined bondline thickness. The adhesive may be applied in various manners including application via a silkscreen process.

The carrier plate 12 may then be prepared to interact with a vacuum bag 38 that will be utilized to apply a vacuum to at least partially debulk the adhesive 36 and thereafter during the curing of the adhesive. In this regard, a temporary adhesive 40, such as two-sided tacky tape, may be applied to the surface of the carrier plate, opposite the attachment surface 32. As described below, the temporary adhesive may temporarily adhere the vacuum bag to the carrier plate and, in one embodiment depicted in FIG. 6, may extend in a closed annular path about the coupling portion 24 of the carrier plate that serves to attach the carrier plate to the adjustment mechanism 22 so as to seal the vacuum bag to the carrier plate. In one embodiment, the temporary adhesive may also be applied to the workpiece about the periphery of the vacuum bag, such as by applying the temporary adhesive along the dashed line marked upon the surface of the workpiece as shown in the embodiment of FIG. 2.

A gasket 42 may also be placed upon the carrier plate 12, opposite the patch 30. See block 66 of FIG. 5. The gasket may be formed of rubber or other materials and may have an annular shape with an innermost portion of the gasket being positioned upon the carrier plate and an outermost portion of gasket extending beyond the carrier plate. As shown in FIG. 6, the gasket of one embodiment defines a central opening and the gasket may be positioned relative to the carrier plate such that the coupling portion 24 of the carrier plate is exposed within the central opening as well as the temporary adhesive that serves to secure the vacuum bag 38 to the carrier plate. After placing the gasket upon the carrier plate, the vacuum bag may be placed over the gasket. In this regard, the vacuum bag may define an opening through which the coupling portion 24 of the carrier plate extends. As a result of the temporary adhesive 40 that has been applied to the carrier plate, the vacuum bag may be sealed to the carrier plate around the opening defined by the vacuum bag and the coupling portion of the carrier plate, as also shown in FIG. 6.

During the adjustment of the standoffs 34, the attachment of the patch 30 to the carrier plate 12, the application of the adhesive 36 to the patch, and the placement of the gasket 42, the temporary adhesive 40 and the vacuum bag 38 upon the carrier plate, the carrier plate may be detached from the installation stand 10. For example, the carrier plate may be detached from the installation stand by threadably detaching the coupling portion 24 of the carrier plate from the adjustment mechanism 22 or by removing or withdrawing the pin that otherwise serves to attach the carrier plate to the adjustment mechanism. Once the carrier plate has been prepared as described above and as shown in blocks 60-66 of FIG. 5, the carrier plate may be attached to the adjustment mechanism, such as to the end of the elongate rod that serves as the adjustment mechanism, so as to again be coupled to the installation stand. Thereafter, the installation stand is placed upon the workpiece, as shown in block 68 of FIG. 5. For example, the installment stand may be placed upon the workpiece with the feet 20 positioned upon the workpiece in the respective locations that were previously identified and marked as shown in FIG. 2. In one embodiment described below and shown in block 70 of FIG. 5, the installation stand may be releasably secured to the workpiece after having been properly placed thereupon. Prior to placing the installation stand upon the workpiece, the carrier plate is positioned relative to the installation stand, such as by the adjustment mechanism, such that the carrier plate will be spaced apart from the surface of the workpiece.

A vacuum system may be in communication with the vacuum bag 38 so as to draw a vacuum within the vacuum bag. In this regard, either prior to or following placement of the installation stand 10 upon the workpiece 14, at least one and, more typically, a pair of vacuum probe bases 44 may also be releasably attached to the workpiece within the periphery that has been marked for the vacuum bag and along which temporary adhesive 40 has been or will be applied. See FIGS. 7 and 8 in which the vacuum bag is transparent. Following placement of the installation stand and the vacuum probe base(s) upon the workpiece, the vacuum bag may be spread out and secured to the temporary adhesive that has been applied to the workpiece and which defines the region in which a vacuum will be applied including the portion of the workpiece that is undergoing rework. The vacuum bag may define opening(s) in alignment with the vacuum probe base(s) that have been previously placed upon the workpiece. The vacuum system may also include one or more vacuum attachments 46, each of which is positioned so as to extend through one of the openings in the vacuum bag and to fluidly connect with the respective vacuum probe base. The vacuum system may also include a vacuum hose 48 fluidly connected to at least one of the vacuum attachments in such a manner as to be in fluid communication with the interior of the vacuum bag, that is, the space between the vacuum bag and the workpiece. The vacuum hose is, in turn, operably connected to a vacuum source. In order to facilitate an airtight connection, a gasket or other seal 52 may be positioned between the vacuum attachment and the vacuum probe base so as to surround the opening defined by the vacuum bag. In one embodiment in which a second vacuum probe base has been positioned within the vacuum bag, a pressure gauge 54 may be connected to the vacuum attachment so as to monitor the pressure within the vacuum bag.

As shown in block 72 of FIG. 5, the carrier plate 12 is then controllably positioned in a first predefined position relative to the workpiece 14, such as in an aligned relationship to the portion of workpiece to be reworked, while maintaining a gap between the patch 30 and the workpiece as illustrated in FIG. 6. In this regard, a gap having a predefined thickness, such as a quarter inch, may be established between the patch and the workpiece and, more particularly, between the adhesive 36 applied to the patch and the adhesive applied to the workpiece. See block 72 of FIG. 5. The carrier plate may be controllably positioned in various manners, but, in one embodiment, the installation stand 10 includes an adjustment mechanism 22 as described above which may controllably position the carrier plate in such manner as to define the desired gap. For example, the adjustment mechanism may include an elongate rod that may be threadably advanced relative to the base 16 to a point at which the predefined gap exists between the patch and the workpiece. Thereafter, a vacuum may be applied to at least the gap between the patch and the workpiece to at least partially debulk the adhesive. See block 74 of FIG. 5. In this regard, a vacuum may be drawn by the vacuum source which may be held for a predetermined period of time. While various levels of vacuum, including a full vacuum, may be drawn and may be held for various lengths of time, a vacuum of 4 inHg may be established in one embodiment which is held for 10 to 15 minutes in order to debulk the adhesive. By applying the vacuum while maintaining the gap between the patch and the adhesive, the adhesive is exposed to the vacuum which, in turn, draws at least some of the air which may otherwise form voids or porosity from the adhesive. During the application of the vacuum, the gasket 42 extends beyond the carrier plate serves and prevents the vacuum bag 38 from being pulled within the gap by the vacuum or otherwise being caught within the gap. A layer of breather material, such as N-10 air weave or fiberglass, may also be positioned on the workpiece around the patch and the adhesive so as to permit the adhesive to be subjected to the vacuum in an instance in which the gasket is drawn toward and would otherwise contact the workpiece.

Following the application of a vacuum for a predetermined period of time while a gap is maintained between the patch 30 and the workpiece 14, the carrier plate 12 may be repositioned relative to the workpiece to a second predefined position so as to close the gap. See block 76 of FIG. 5. In this regard, the carrier plate may be repositioned so that the standoffs 34 contact to the surface of the workpiece, as illustrated in FIG. 9. Based upon the prior adjustment of the standoffs relative to the attachment surface 32 of the carrier plate, the contact of the standoffs to the surface of the workpiece causes the adhesive 36 to be confined to a thickness having the predetermined bondline thickness. In instances in which the adhesive which was applied to the patch and/or to the workpiece exceeds the predetermined bondline thickness, some of the adhesive may be pushed outside of the carrier plate, but the resulting adhesive will have the predetermined bondline thickness as a result of the prior positioning of the standoffs. The carrier plate may be repositioned in various manners including repositioning the carrier plate utilizing the adjustment mechanism 22, such as an elongate rod as described above.

Once the carrier plate 12 has been repositioned, a vacuum is applied by the vacuum source to the carrier plate and the portion of the workpiece 14 to be reworked while the adhesive at these partially cures. See block 78 of FIG. 5. In one embodiment, the vacuum is maintained while the carrier plate is repositioned, while in another embodiment, the vacuum is terminated during the repositioning of the carrier plate and is then recommenced following the repositioning of the carrier plate. The vacuum that is applied following the repositioning of the carrier plate may be to a different level, or the same level as the vacuum applied while a gap was maintained between the patch 30 and the workpiece and, in one embodiment, a full vacuum is applied following repositioning of the carrier plate. Additionally, the vacuum is applied following the repositioning of the carrier plate for a predetermined time or until a predetermined result is accomplished, such as the curing of the adhesive. Once cured, the vacuum may be discontinued and the vacuum bag 38 may be detached from the workpiece. Thereafter, the carrier plate may be separated from the patch, such as by lifting or by prying the carrier plate from the patch. Any adhesive 36 that has been pushed beyond the patch may be cleaned from the workpiece and the resulting workpiece may then be returned to service with improved mechanical properties attributable to the patch being applied to the portion of the workpiece that exhibited the inconsistencies.

The installation stand 10 of one embodiment may be configured to apply mechanical pressure to the patch 30 to urge the patch into contact with the workpiece 14. Although the mechanical pressure may be applied in conjunction with a vacuum, the installation stand of one embodiment may be utilized to affix a patch to a workpiece without the use of a vacuum. In this embodiment, the installation stand, such as the attachment mechanism 22, may be configured to apply pressure to the patch, such as by extending the elongate rod and, in turn, the carrier plate 12 toward the workpiece, while the feet 20 of the installation stand are fixed in position relative to the workpiece, such as a result of the vacuum attachment of the feet to the workpiece in one embodiment.

In order to facilitate the curing of the adhesive 36 and to increase the efficiency of the rework procedure, the carrier plate 12 may be formed of a thermally conductive material, such as a metal, e.g., aluminum, and may be configured to be heated as shown in block 80. In one embodiment depicted in FIG. 10, a smart blanket or other heating blanket 56 may be applied to the surface of the carrier plate, opposite the attachment surface 32. For example, the smart blanket or heating blanket may be applied over the vacuum bag 38 such that the vacuum bag and gasket 42 are positioned between the smart blanket or heating blanket and the carrier plate. Alternatively, the smart blanket or heating blanket may be positioned proximate the carrier plate such that the gasket and the vacuum bag are spaced from the carrier plate by the smart blanket or heating blanket. Still further, the carrier plate may define an internal cavity that may house the smart blanket or heating blanket. Once the carrier plate is repositioned such that the predefined bondline thickness is established, the smart blanket or heating blanket may be actuated so as to heat the carrier plate which, in turn, heats the adhesive and increases the rate at which the adhesive cures. The smart blanket or heating blanket of this embodiment may be actuated in various manners. For example, electrical wiring may extend from the smart blanket or heating blanket to an external controller which controllably supplies power via the electrical wiring to the smart blanket or heating blanket in order to cause the smart blanket or heating blanket to generate heat. Alternatively, the smart blanket or heating blanket may have an associated battery and may be configured to be wirelessly actuated in order to generate heat. While a smart blanket or heating blanket may be utilized to heat the carrier plate, the carrier plate may be configured to be heated in other manners including, for example, embedding heating elements within the carrier plate that are actuated, either wirelessly or via wireline, in order to cause the carrier plate to generate heat so as to heat the adhesive and increase the rate of curing.

In one embodiment, the installation stand 10 may be configured to be releasably secured to the workpiece 14 during the process of controllably positioning the carrier plate 12 relative to the workpiece. See block 70 of FIG. 5. While the installation stand may be releasably secured to the workpiece in various manners, the installation stand of one embodiment depicted in FIG. 10 may define vacuum channels 58 that extend through the legs 18 from the base 16 to the feet 20. By connecting a vacuum source 59 to the internal vacuum channels, the feet of the installation stand may be secured to the workpiece by the suction generated by the vacuum source. By controllably actuating the vacuum source, the installation stand may be secured to the workpiece during positioning of the carrier plate, but released from the workpiece in order to remove the installation stand therefrom.

In one embodiment, the installation stand 10 may also define a vacuum channel that opens through the attachment surface 32 of the carrier plate 12. By connecting a vacuum source to the vacuum channel, the patch 30 or the spacer may be secured to the carrier plate by the suction generated by the vacuum source. By controllably actuating the vacuum source, the spacer may be secured to the carrier plate while adjusting the standoffs 34 with respect to the carrier plate, but released from the carrier plate once the adjustment of the standoffs is completed. Additionally or alternatively, controllable actuation of the vacuum source may also secure the patch to the carrier plate while positioning the patch relative to the workpiece 14 and affixing the patch thereto, while permitting the patch to be released from the carrier plate following affixation of the patch to the workpiece to permit removal of the carrier plate.

In one embodiment, the installation stand 10 may be detached from the carrier plate 12 following repositioning of the carrier plate and contact of the standoffs 34 with the surface of the workpiece 14 and the application of the vacuum to the carrier plate and the portion of the workpiece to be reworked. See block 82 of FIG. 5. As shown in FIG. 11, the vacuum applied following repositioning of the carrier plate will retain the carrier plate in position such that detachment of the carrier plate from the installation stand, such as by detaching the coupling portion 24 of the carrier plate from the adjustment mechanism 22, permits the installation stand to be removed and to be reused, such as with another carrier plate in conjunction with the rework of another workpiece in order to make efficient use of the installation stand. See block 84 of FIG. 5.

Many modifications and other embodiments set forth herein will come to mind to one skilled in the art to which these embodiments pertain having the benefit of the teachings presented in the foregoing descriptions and the associated drawings. Therefore, it is to be understood that the embodiments are not to be limited to the specific ones disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. An installation assembly comprising:
an installation stand; and
a carrier plate supported by the installation stand, wherein the carrier plate comprises an attachment surface configured to carry a first workpiece in a facing relationship to a second workpiece and a plurality of standoffs configured to extend outwardly from the attachment surface to define a predetermined bondline thickness between the first and second workpieces,
wherein the installation stand comprises an adjustment mechanism for controllably positioning the carrier plate relative thereto and relative to the second workpiece.

2. An installation assembly according to claim 1 wherein the plurality of standoffs are adjustable relative to the attachment surface of the carrier plate to define different predetermined bondline thicknesses.

3. An installation assembly according to claim 1 wherein the carrier plate is configured to be detached from the installation stand.

4. An installation assembly according to claim 1 wherein the installation stand comprises a plurality of feet configured to support the installation stand upon the second workpiece.

5. An installation assembly according to claim 4 further comprising a vacuum system configured to apply a vacuum between the feet and the second workpiece.

6. An installation assembly according to claim 1 wherein the carrier plate is comprised of a thermally conductive material and is configured to be heated.

7. An installation assembly comprising:

an installation stand;

carrier plate supported by the installation stand, wherein the carrier plate comprises an attachment surface configured to carry a first workpiece in a facing relationship to a second workpiece, wherein the installation stand comprises an adjustment mechanism for controllably positioning the carrier plate to a first predefined position relative to the second workpiece so as to define a gap between the first and second workpieces and also to a second predefined position relative to the second workpiece such that a predetermined bondline thickness is defined between the patch and the second workpiece; and a vacuum system configured to apply a vacuum both while the carrier plate is in the first predefined position and in the second predefined position.

8. An installation assembly according to claim 7 wherein the carrier plate comprises a plurality of standoffs configured to extend outwardly from the attachment surface to define the predetermined bondline thickness between the first and second workpieces in the second predefined position.

9. An installation assembly according to claim 8 wherein the plurality of standoffs are adjustable relative to the attachment surface of the carrier plate to define different predetermined bondline thicknesses.

10. An installation assembly according to claim 7 wherein the carrier plate is configured to be detached from the installation stand.

11. An installation assembly according to claim 7 wherein the installation stand comprises a plurality of feet configured to support the installation stand upon the second workpiece, and further comprising an attachment vacuum system configured to apply a vacuum between the feet and the second workpiece.

* * * * *